(12) United States Patent
Mahalank et al.

(10) Patent No.: US 8,223,949 B2
(45) Date of Patent: Jul. 17, 2012

(54) METHOD, APPARATUS AND SOFTWARE FOR PROVIDING COMMUNICATIONS BETWEEN A PACKET SWITCHED NETWORK AND A PUBLIC SWITCHED TELEPHONE NETWORK

(75) Inventors: Shashikiran Bhalachandra Mahalank, Bangalore Karnataka (IN); Gururaj Maknur Krishnamurthy, Bangalore Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1133 days.

(21) Appl. No.: 12/056,284

(22) Filed: Mar. 27, 2008

(65) Prior Publication Data

US 2008/0267174 A1    Oct. 30, 2008

(30) Foreign Application Priority Data

Apr. 27, 2007   (IN) .............................. 909/CHE/2007

(51) Int. Cl.
*H04M 7/00*   (2006.01)
(52) U.S. Cl. .............. 379/219; 379/211.02; 379/221.08; 379/221.13; 379/265.09; 379/88.17; 370/352; 370/356; 370/401; 709/218
(58) Field of Classification Search .................. 379/219, 379/221.08, 221.1, 221.12–221.14; 370/352, 370/356
See application file for complete search history.

(56) References Cited

U.S. PATENT DOCUMENTS

| | | | |
|---|---|---|---|
| 6,668,049 B1 * | 12/2003 | Koch et al. ............... | 379/211.02 |
| 6,735,621 B1 * | 5/2004 | Yoakum et al. ............ | 709/218 |
| 2004/0062375 A1 * | 4/2004 | Wang et al. ............... | 379/219 |
| 2006/0209791 A1 | 9/2006 | Khadri et al. | |
| 2008/0130628 A1 * | 6/2008 | Lin et al. .................. | 370/352 |

OTHER PUBLICATIONS

Haerens Alcatel Bell F: "Intelligent Network Application Part (INAP) Support of the SIP/SDP Architecture"; Internet Engineering Task Force, IETF, CH Oct. 1, 1999; XP015013935.
Frank Miller, Shan Lu, Priya Gupta, Akif Arsoy, Sentito Networks: Carrying TCAP in SIP Messages (SIP-TCAP); Internet Engineering Task Force, IETF, CH, Jan. 1, 1900, XP015004414.

* cited by examiner

Primary Examiner — Joseph J Nguyen

(57) ABSTRACT

A method, apparatus and software is disclosed in which a gateway server provides communications between an Internet Protocol (IP) network and Public Switched Telephone Network (PSTN) to enable messaging between an IN server device in the PSTN and a Session Initiation Protocol (SIP) Application Server (AS) on the IP network.

20 Claims, 9 Drawing Sheets

301

```
REGISTER sip:CA.cym.com SIP/2.0
From: ua1 <sip:shashikiran@nnl.cym:5061>
To: ua1 <sip:shashikiran@nnl.cym:5061>
Via: SIP/2.0/UDP 15.10.43.61:5061;branch=z9hG4bKhjhs8ass877
Call ID: 1.2492.15.10.43.61@sipp.call.id
CSeq: 1 REGISTER
Contact: sip:ua1@15.10.43.61:5061
Content Length: 0
Expires: 300
```

| | | | |
|---|---|---|---|
| Message name: | SIP-Register | | |
| Message type: | Begin | | |
| Component type: | Invoke | | |
| Operation code: | 0x01 | | |
| Method, | 0x80, | Mandatory, | charString |
| Required URI, | 0x81, | Mandatory, | charString |
| SIP Version, | 0x82, | Mandatory, | charString |
| From, | 0x83, | Mandatory, | charString |
| To, | 0x84, | Mandatory, | charString |
| Via, | 0x85, | Mandatory, | charString |
| Call ID, | 0x86, | Mandatory, | charString |
| CSeq, | 0x87, | Mandatory, | charString |
| Contact, | 0x88, | Mandatory, | charString |
| Content Length, | 0x89, | Mandatory, | charString |
| Expires, | 0x8A, | Optional, | charString |
| End Message | | | |

Figure 4

Component Portion

0X6C Component Portion Tag
0x44 Component Portion Length
0XA1 Component Type (INVOKE)
0X42 Component Type Length
0x02 Operation Code Tag
0x01 Operation Code Length
0x00 Operation Code
0x80 Tag 1
0x06 Length 1
REGISTER
0x81 Tag 2
0x13 Length 2
sip:CA.cym.com
0x82 Tag 3
0x07 Length 3
SIP/2.0
0x83 Tag 4
0x1b Length 4
From: ua1 <sip:shashikiran@nnl.cym:5061>; tag1
0x84 Tag 5
0x22 Length 5
To: ua1 <sip:shashikiran@nnl.cym:5061>
0x85 Tag 6
0x22 Length 6
Via: SIP/2.0/UDP 15.10.43.61:5061;branch=z9hG4bKhjhs8ass877
0x80 Tag 7
0x06 Length 1
Call-ID: 1.2492.15.10.43.61@sipp.call.id
0x81 Tag 8
0x13 Length 3
CSeq: 1 REGISTER
0x82 Tag 9
0x07 Length 3
Contact: sip:ua1@15.10.43.61:5061
0x83 Tag 10
0x1b Length 4
Content-Length: 0
0x84 Tag 11
0x22 Length 5
Expires: 300

208
```
Message-type:        End
Component-type:      Return Result Last
Operation-code:      0x0A
    Status Code,     0x80,  Mandatory,    charString
    Reas. Phrase,    0x81,  Mandatory,    charString
    SIP Version,     0x82,  Mandatory,    charString
    From,            0x83,  Mandatory,    charString
    To,              0x84,  Mandatory,    charString
    Via,             0x85,  Mandatory,    charString
    Call ID,         0x86,  Mandatory,    charString
    CSeq,            0x87,  Mandatory,    charString
    Contact,         0x88,  Mandatory,    charString
    Content Length,  0x89,  Mandatory,    charString
    Expires,         0x8A,  Optional,     charString
End Message
```

```
SIP/2.0 200 OK
From: ua1 <sip:shashikiran@nnl.cym:5061>
To: ua1 <sip:shashikiran@nnl.cym:5061>
Via: SIP/2.0/UDP 15.10.43.61:5061;branch=z9hG4bKhjhs8ass877
Call ID: 1.2492.15.10.43.61@sipp.call.id
CSeq: 1 REGISTER
Contact: sip:ua1@15.10.43.61:5061
Content Length: 0
Expires: 300
```

Figure 7

METHOD, APPARATUS AND SOFTWARE FOR PROVIDING COMMUNICATIONS BETWEEN A PACKET SWITCHED NETWORK AND A PUBLIC SWITCHED TELEPHONE NETWORK

RELATED APPLICATIONS

Benefit is claimed under 35 U.S.C. 119(a)-(d) to Foreign application Ser. 909/CHE/2007 entitled "A METHOD, APPARATUS AND SOFTWARE FOR PROVIDING COMMUNICATIONS BETWEEN A PACKET SWITCHED NETWORK AND A PUBLIC SWITCHED TELEPHONE NETWORK" by Hewlett-Packard Development Company, L.P., filed on 27 Apr. 2007, which is herein incorporated in its entirety by reference for all purposes.

BACKGROUND OF THE INVENTION

In Public Switched Telephone Networks (PSTNs) additional end user services are commonly provided in addition to the facility to make ordinary telephone calls. For example, prepaid calling, call forwarding, call redirection or ring-back services. Such services are commonly implemented using Intelligent Network (IN) technology that uses Service Switching Points (SSPs) to trigger Service Control Points (SCPs) to provide these additional services in the PSTN. Such IN services may be implemented in an IN Service Creation Environment (SCE) that enables service designers to build the appropriate service logic into corresponding SSPs and SCPs.

Internet Protocol (IP) networks are increasingly used to provide the functions of PSTNs, using Voice over IP (VOIP) technology. IP networks may be interconnected with PSTNs to provide such PSTN functions to VOIP subscribers. VOIP is implemented using protocols such as Session Initiation Protocol (SIP), Session Description Protocol (SDP), Real-time Transport Protocol (RTP), and Real-time Transport Control Protocol (RTCP). However, providing PSTN services on VOIP networks is costly as it normally requires new SCE development. Furthermore, engineers need to be re-trained in using these new SCEs.

BRIEF DESCRIPTION OF THE DRAWINGS

Embodiments of the invention will now be described, by way of example only, with reference to the accompanying drawings in which:

FIG. 3 shows a SIP message received by the gateway server of FIG. 2;

FIG. 4 shows a message definition used by the gateway server to process the SIP message of FIG. 3;

FIGS. 5*a* and 5*b* show a TCAP message transmitted by the gateway server of FIG. 2;

FIG. 6 shows a further message definition used by the gateway server to process the TCAP message received in response to the TCAP message of FIGS. 5*a* and 5*b*;

FIG. 7 shows a further SIP message transmitted by the gateway server of FIG. 2;

DETAILED DESCRIPTION OF PREFERRED EMBODIMENTS OF THE INVENTION

Figure 1:
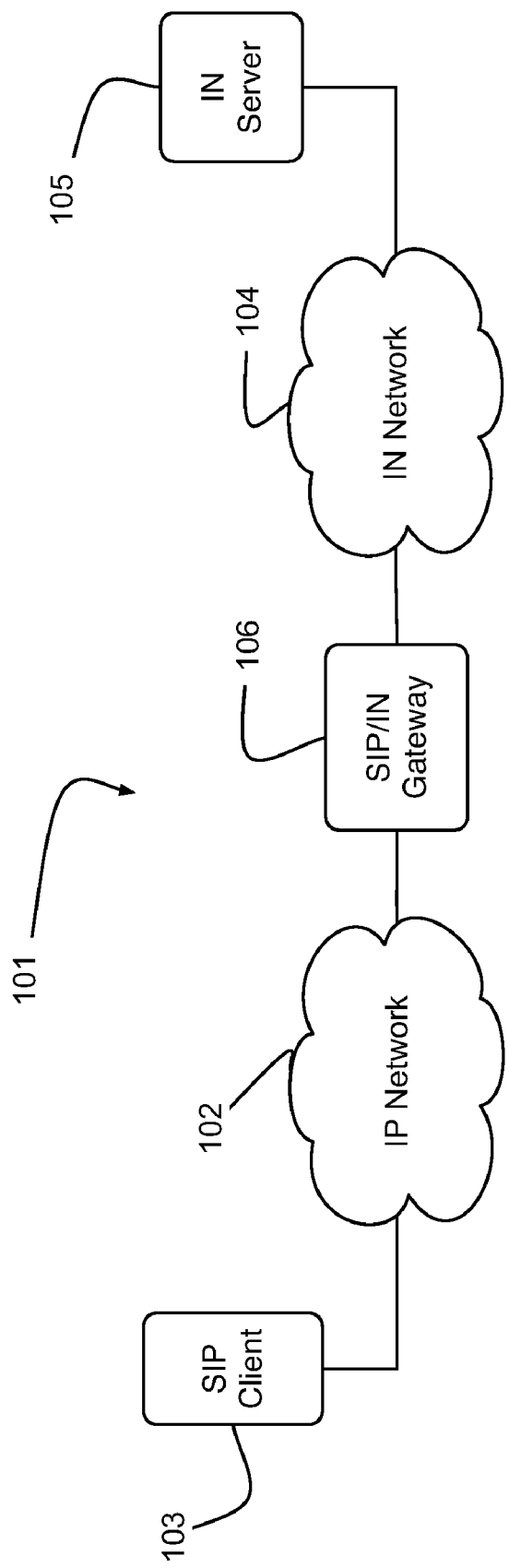
FIG. 1 is a schematic illustration of a communications network.

With reference to FIG. 1, a telecommunications network 101 comprises a packet switched network 102 in the form of an Internet Protocol (IP) network enabled with Session Initiation Protocol (SIP) and being connected to a SIP client device 103 in the form of a Voice Over IP (VOIP) telephone device. The telecommunications network 101 further comprises a Public Switched Telephone Network (PSTN) 104 including Intelligent Network (IN) technology, referred to herein as an IN network. The IN network 104 is enabled with the Transactions Capabilities Application Part (TCAP) protocol. A computer 105 in the form of an IN server providing a Service Control Point (SCP) is connected to the IN network 104. The IN and IP networks are interconnected by a further computer 106 in the form of a gateway arranged to provide a communications link between the IP and IN networks 102, 104.

The gateway 106 is arranged to pass messages, routed by the IP network 102 from the SIP client 103, to the IN server 105 via IN network 104. Conversely, the gateway 106 also enables communications from the IN server 105 to the SIP client. The IN server 105 has been implemented and deployed using an IN Service Creation Environment (SCE) but is arranged to provide the implemented IN services to SIP clients attached to the IP network 102. The gateway 106 is arranged to receive SIP messages from the SIP client 103 over the IP network 102 and to encapsulate the message in a TCAP message, the TCAP message then being sent to the IN server 105 over the IN network 104. The IN server 105 runs one or more application programs, each program providing one or more of the IN services such as a Free-Phone Service or a Directory Lookup Service. The application program may also provide one or more SIP Services such as a Registrar Service or a Re-Direct Service. Each IN service application program is arranged to extract the SIP messages from received TCAP messages and to provide its respective addition service in response to the received SIP messages. Where appropriate, each IN service application program is arranged to respond to a received SIP message by returning an appropriate SIP message to the gateway 106, encapsulated in a TCAP message. The gateway is arranged to extract the SIP message from the TCAP message and forward the SIP message to the SIP client 103 over the IP network 102. Thus, the gateway 106 enables additional services to be provided on a Packet Switched Network via call logic located on a PSTN and created using a PSTN SCE.

Figure 2:
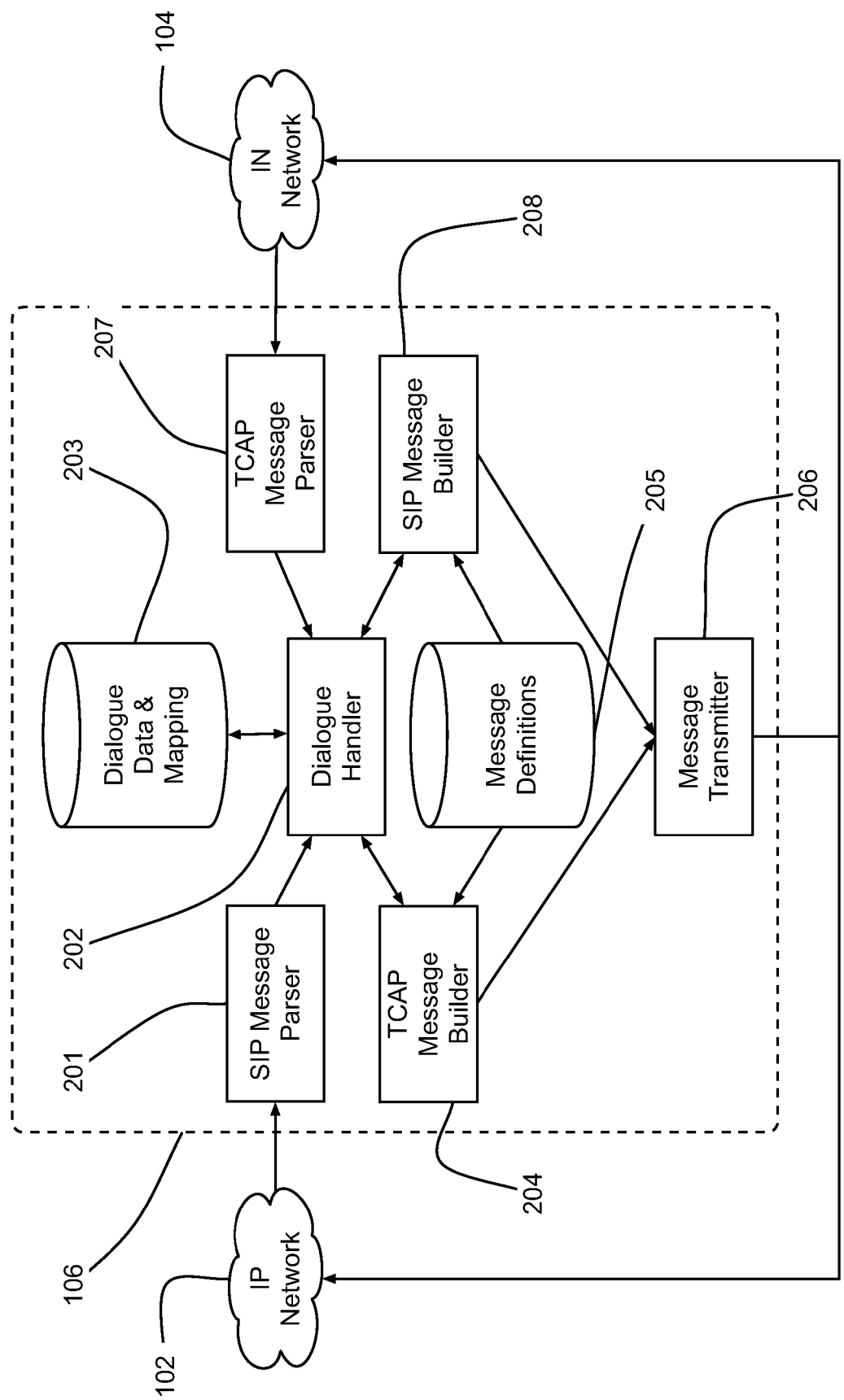
FIG. 2 is a schematic illustration of a gateway server in the communications network of FIG. 1.

With reference to FIG. 2, the gateway 106 comprises a SIP message parser 201 arranged to parse SIP messages received from the SIP client 103 via the IP network 102 and to extract a predetermined set of SIP header elements from each received SIP message. The SIP message parser 201 communicates with a dialogue handler 202, which records the respective message dialogues between the SIP client 103, IN server 105 and gateway 106. In addition, the dialogue handler 202 maps each SIP dialogue to its corresponding TCAP message dialogue. The SIP and TCAP dialogues and their mappings are stored in a dialogue and mapping data store 203. The dialogue handler 202 is described in further detail below.

The dialogue handler 202 communicates with a TCAP message builder 204, which is arranged to generate a TCAP message encapsulating the extracted elements of a received SIP message. The TCAP message builder 204 uses one of a set of message definitions 205, which provide definitions for how each type of SIP message is encapsulated within a TCAP message. The TCAP message builder 204 communicates with a message transmitter 206 arranged to transmit a TCAP message built by the TCAP message builder 204 over the IN network 104 to the IN server 105.

The gateway 106 further comprises a TCAP message parser 207 arranged to parse TCAP messages received from the IN network 104 from the IN server 105 and to extract the TCAP information elements, comprising of TCAP protocol data and SIP response received from the IN server 105 via the IN network 104. The TCAP message parser 207 communicates with the dialogue handler 202, which identifies whether an incoming TCAP message is part of a new or existing dialogue logged in the dialogue and mapping data store 203.

The dialogue handler 202 communicates with a SIP message builder 208 arranged to build a SIP message from the extracted elements of a received TCAP message using the message definitions 205. The SIP message builder 208 communicates with the message transmitter 206 to transmit built SIP messages to the SIP client 103 via the IP network 102.

The dialogue handler 202 is arranged to maintain both SIP dialogues between SIP client 103 and gateway 106 and the TCAP transactions and dialogue between gateway 106 and IN sever 105. Each SIP message comprises a "To" tag, a "From" tag and a "Call-ID" which together uniquely identify the peer-to-peer SIP relationship between gateway 106 and the SIP client 103. Thus this data is used to identify the SIP dialogue. The transaction identifiers of each TCAP message define the TCAP dialogue information between gateway 106 and the IN server 105. The gateway maintains both SIP and TCAP dialogue information in the dialogue and mapping data 203 described above. Each entry in the dialogue and mapping data 203 contains a mapping of each set of SIP dialogue information to the corresponding TCAP dialogue information.

For incoming SIP messages, the dialogue handler 202 checks if the message is part of an existing dialogue using the dialogue and mapping data 203 and provides the corresponding the TCAP dialogue information to the TCAP message builder 204 to be included in the TCAP message to be sent to IN server 105. If a received SIP message is not a part of existing dialogue, the new TCAP dialogue is recorded in the dialogue and mapping data 203. Similarly, for incoming TCAP messages, the dialogue manager 202 is arranged to identify the corresponding SIP dialogue data in the dialogue and mapping data 203 using the dialogue information contained in the incoming TCAP message. Again, if the incoming TCAP message is not a part of an existing dialogue, the dialogue handler 202 is arranged to create a new entry in the dialogue and mapping data 203 and to provide the corresponding SIP dialogue information for use by the SIP message builder 208.

As noted above, the "To" and "From" header fields of a SIP message serve as a general mechanism to identify a dialogue. The combination of these two fields, one from each participant in the dialogue, along with the "Call-ID" header field, uniquely identifies a SIP dialogue. However, when a SIP message initiator sends a request outside of an existing dialogue, it contains only a "From" tag, thus providing only half of the SIP dialogue data. The dialogue data is completed once the responding entity replies, thus contributing the second half of the dialogue, the "To" tag. Thus the "Call-ID" header field acts as a unique identifier to group together a series of SIP messages and must be the same for all requests and responses in a dialogue.

As noted above, TCAP transaction identifiers are used to maintain the TCAP dialogue information. Transaction identifiers are assigned by each of two TCAP entities, that is the gateway 106 and the IN server 105, thus enabling each entity to uniquely identify the transaction and associate the entire contents of the message with that particular transaction. There are two types of transaction identifiers, that is, Originating Transaction Identifiers (OTIDs) and Destination Transaction Identifiers (DTIDs). An OTID is generated and maintained by the TCAP dialogue initiator and are used to identify the transaction at that end. A DTID is generated by the TCAP dialogue respondent and identifies the transaction at the responding end. The combination of both these transaction identifiers enables the dialogue handler 202 to identify whether a TCAP message is part of an existing dialogue.

In the present embodiment, SIP messages are encapsulated in TCAP messages by both the gateway 106 when sending messages to the IN server 105 and by the IN server 105 when sending messages to the gateway 106. In the gateway 106, the message definitions 205, define in detail, how each specific SIP message type should be encapsulated in a specific combination of a TCAP message type and accompanying message component type. In the present embodiment, the application program providing the additional services on the IN server 105 also comprises an equivalent set of message definitions to enable the SIP messages created by the application program to be encapsulated in TCAP messages for transmission across the IN network 104 to the gateway 106. An overview of the SIP message types and the corresponding TCAP message types and accompanying message component types are set out in the table below, in which the terms "inbound" and "outbound" is used to refer respectively to messages being received or sent by the SIP/IN gateway 106:

| | Encapsulating TCAP Message | | |
|---|---|---|---|
| SIP Message | Message Type | Component Type | Comments |
| INVITE, MESSAGE or REGISTER | TC-BEGIN | TC-INVOKE | These message types are dialogue initiators |
| CANCEL | TC-END or TC-CONTINUE | TC-RET ERR | TC-END is used for the inbound SIP CANCEL and CONTINUE is used for outbound SIP messages |
| OPTIONS | TC-BEGIN or TC-CONTINUE | TC-INVOKE | TC-BEGIN is used for messages received outside a SIP dialogue. TC-CONITNUE is used for messages within a SIP dialogue. |
| ACK | TC-CONTINUE or TC-END | TC-RET RES LAST | TC-CONTINUE is used only on receipt of a 200 OK response sent back for an INVITE transaction. An empty TC-END message is used for a non-2XX Response. |
| BYE | TC-CONTINUE | TC-INVOKE | The BYE message is used to terminate the dialogue. |
| Provisional (100 to 199) | TC-CONTINUE | TC-INVOKE | A Provisional message is carried by a TC-CONTINUE message |

-continued

Encapsulating TCAP Message

| SIP Message | Message Type | Component Type | Comments |
|---|---|---|---|
| Success (200 to 299) | TC-CONTINUE/ TC-END | TC-INVOKE/ TC-RET RES LAST | as the dialogue is not yet confirmed. The SUCCESS message is a final response for an INVITE message and has to be acknowledged by an ACK message, thus TC-CONTINUE & TC-INVOKE are used in such cases. TC-END and TC-RET RES LAST are used in the case of a 2XX message for SIP requests other than INVITE |
| Redirection (300 to 399) | TC-CONTINUE | TC-RET RES LAST | |
| Client Error (400 to 499) Server Error (500 to 599) Global Failure (600 to 699) | TC-CONTINUE or TC-END | TC-RET ERR | TC-CONTINUE is used in the case of a 4XX response for an INVITE message. END is used in the case of 4XX response for non-INVITE messages. |

An example of a request from the SIP client 103 and a response from the IN server 105 being processed by the gateway 106 will now be described with reference to FIGS. 3 to 7. With reference to FIG. 3, a REGISTER message 301 is received by the gateway 106 from the SIP client 103. The REGISTER message 301 is a request to register the SIP client 103 for a particular service for which access is controlled by a registrar application program on the IN server 105. The SIP message comprises a set of standard SIP headers, used to identify particular types of data within the SIP message. In the present example, the first header of the message 301 identifies the SIP method to be performed, which, in this case, is the REGISTER method. The "From" header identifies Universal Resource Identifier (URI) of the SIP client 103. The "To" header contains the same URI as that of the "From" header. The "Call ID" header contains a unique identifier of the SIP dialogue of which the message 301 forms a part. The "CSeq" header is arranged to identify and order transactions within a given SIP dialogue and thus consists of a sequence number and a method name. The "Cseq" header present a SIP Response matches that of a corresponding SIP Request and is thus used by the SIP client 103 to differentiate otherwise similar messages. The "Via", "Contact", "Content Length" and "Expires" headers are further known SIP headers.

In response to the receipt of the REGISTER message 301, the gateway retrieves the message definition 208 for that type of message as shown in FIG. 4. The message definition, provides instructions on how the elements of the received REGISTER message should be extracted and encapsulated within a TCAP message for transmission over the IN network 104 to the IN server 105. Firstly, the message definition 208 defines the TCAP message name, followed by the type of the message and the message component as described in the above table. The message definition also defines an operation code that is unique to each message definition and arranged, in the present embodiment, to identify which message definition should be used to extract encapsulated SIP message elements from a TCAP component part. Lastly, the message definition defines a set of tags, in the form of a unique hexadecimal numbers, and corresponding SIP header names. These tags comply with the Abstract Syntax Notation One (ASN.1) specification for describing data structures. The header names identify the headers from the SIP message that are to be extracted from the SIP message and then encapsulated within the TCAP message component part. The corresponding tags are used to identify the positions of each extracted element within the component part.

Figure 5A:
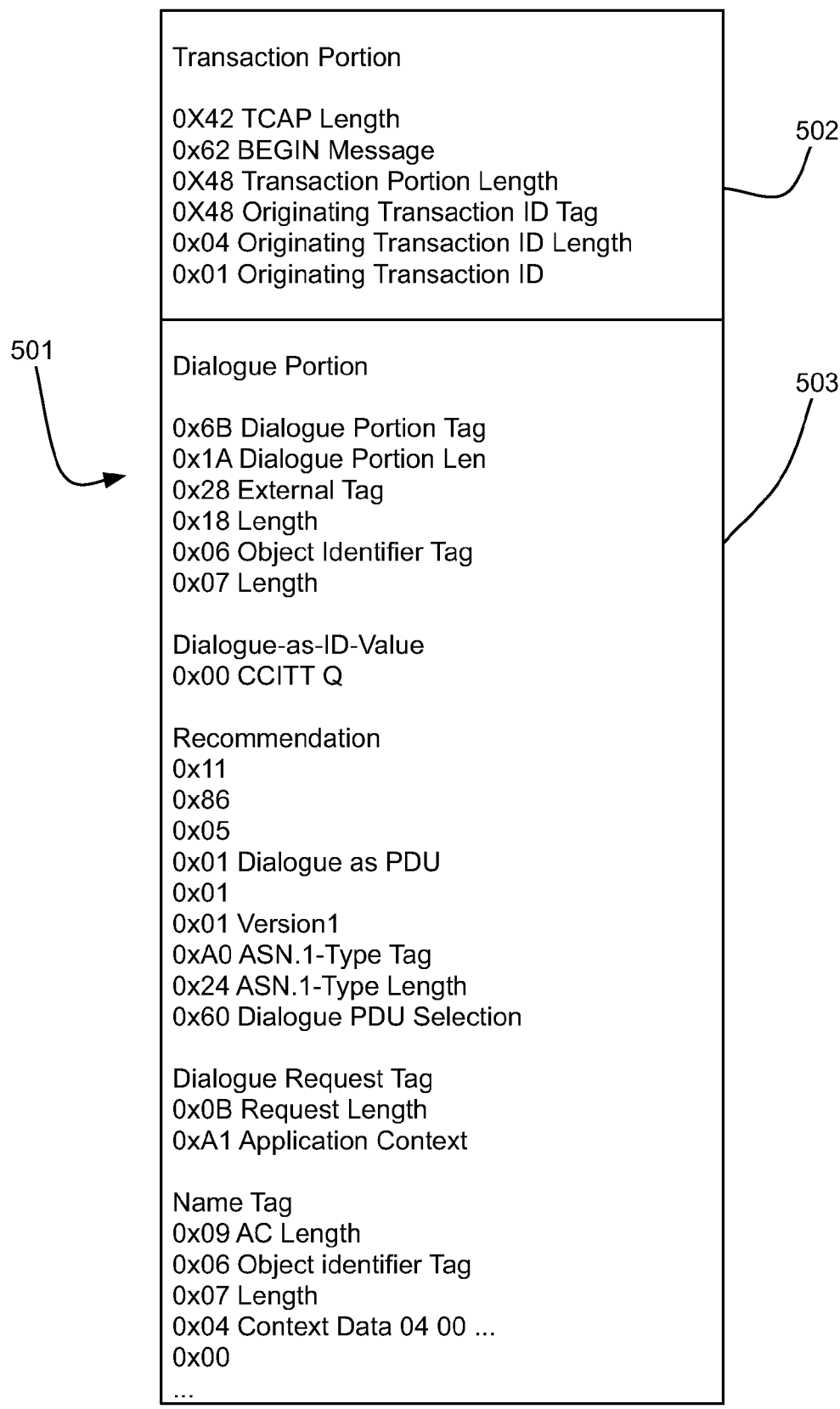

FIGS. 5a and 5b show the result of applying the REGISTER message definition 208 to the REGISTER message 301. As shown in FIG. 5a, the TCAP message 501 comprises a standard TCAP transaction portion 502 and dialogue portion 503. With reference to FIG. 5b, the component portion 504 conforms to the message definition 208 and comprises the set of eleven unique tags with their corresponding extracted elements from the SIP message 301. The TCAP message 501 is then transmitted to the IN server 105 which is arranged to extract the elements of the original SIP message 301 from the component part 504 of the TCAP message 501. The registrar application program is provided with a complementary set of message definitions to the message definitions 208. The registrar application program identifies the appropriate message definition from the operation code in the component part 504 of the received TCAP message 501. Applying the message definition to the TCAP message extracts the SIP message elements for processing by the registrar application program.

When the registrar application program has successfully registered the SIP client 103, it creates a response for the SIP client 103 in the form of a SIP 200 OK type message. This message is encapsulated in an END type TCAP message with a RETURN RESULT LAST type component part. The SIP 200 OK message is encapsulated within the component part of the TCAP response in accordance with the SIP 200 OK message definition and then transmitted to the gateway 106. At the gateway 106, the type of the received TCAP message and component is identified by its operation code and the corresponding SIP 200 OK message definition 208, as shown in FIG. 6, is applied to extract the SIP 200 OK message from the received TCAP response. With reference to FIG. 7, the resulting SIP 200 OK message 701 is then transmitted by the gateway 106 to the SIP client 103 over the IP network 102.

Figure 8:
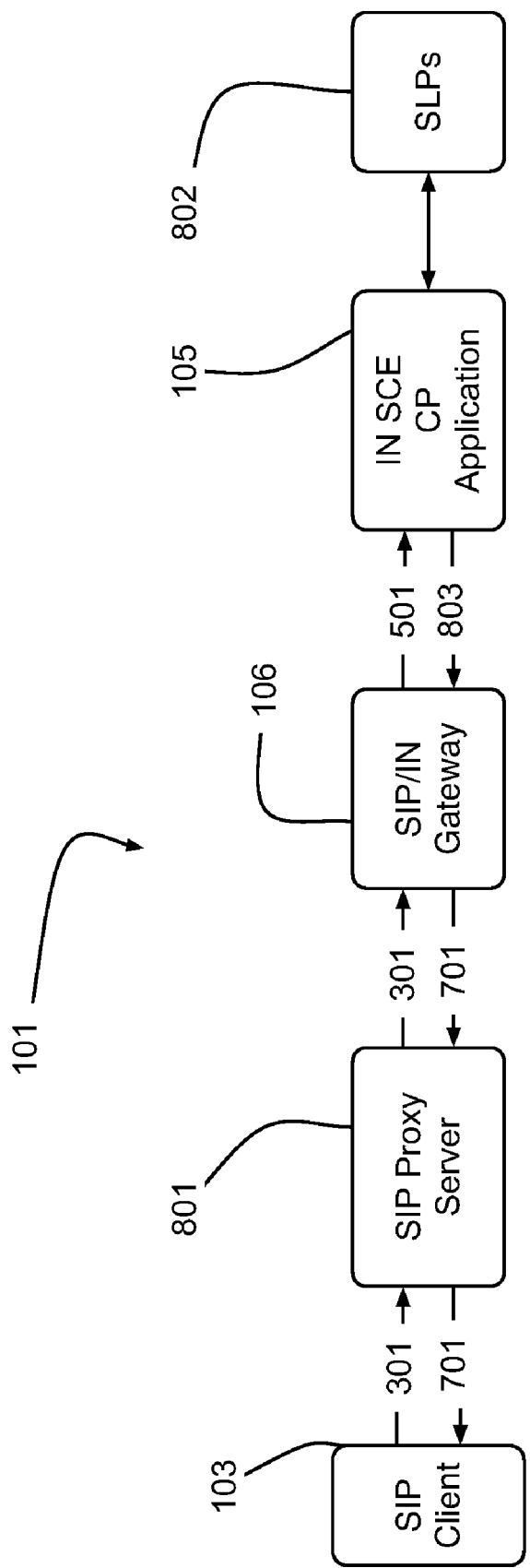
FIG. 8 is a schematic illustration of the message flow of the messages of FIGS. 3, 5*a*, 5*b* and 7 between the relevant network elements.

FIG. 8 shows the message flow of the Register request example described above. The message flow is initiated by the SIP client 103 with the SIP Register message 301, which is forwarded by a SIP proxy server 801 to the gateway 106. The gateway 106 then encapsulates the SIP Register message 301 in the TCAP message 501 which is sent to the IN server in the form of an IN Service Control Environment (SCE) Call Processing (CP) application program. The SCE CP application program interprets the received TCAP message and invokes the corresponding Registrar Service Logic Program (SLP) 802 providing the registrar service. The SLP can then perform the appropriate update to the location database (not shown) and send back the SIP 200 OK response to the gateway 106 encapsulated in a TCAP TC-END message 803. The gateway 106 converts the TCAP message into the SIP 200 OK Response 701 and sends it to the SIP proxy server 801 which forwards it to the SIP client 103.

Figure 9:
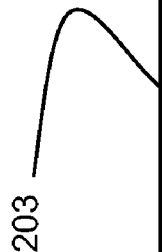
FIG. 9 shows a sample of dialogue data recorded by the gateway server of FIG. 2.

As noted above, the gateway 106 maintains a log 203. An example of the data held in the log is shown in FIG. 9. In the first column, the SIP dialogue data is held in the form of the "From", "To" and "Call ID" data for each separate SIP dialogue. Each SIP dialogue is mapped to the corresponding TCAP transaction identifiers (OTID & DTID) in the second column. Thus, using the log 203, the gateway 106 can identify the appropriate corresponding SIP or TCAP dialogues for a given received TCAP or SIP message.

Figure 10:
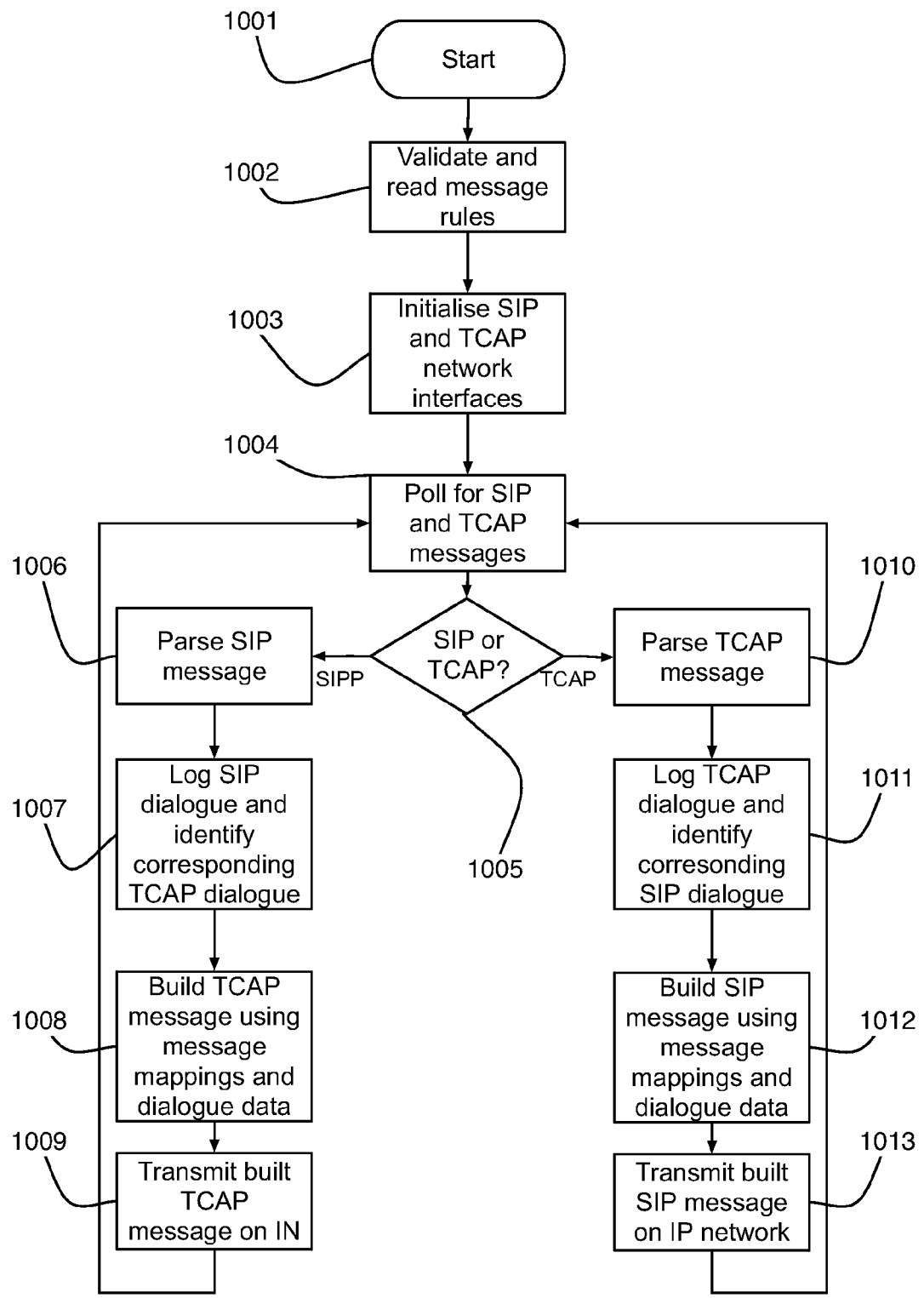
FIG. 10 is a flow chart illustrating the processing performed by the gateway server of FIG. 2.

The processing performed by the gateway 106 when processing messages will now be described further with reference to the flow chart of FIG. 10. At step 1001, the gateway is initialised and processing moves to step 1002. At step 1002, the message definitions are identified for future access. Processing then moves to step 1003 where the network interfaces to the IP and IN networks 102, 104 are initialised and processing moves to step 1004. At step 1004, the network interfaces are periodically polled for incoming SIP or TCAP messages. When a message is received, processing moves to step 1005 where the type of the message is determined. If the message is a SIP message, processing moves to step 1006.

At step 1006, the message is parsed so as to identify the SIP message type and to extract the dialogue data in the form of the "From", "To" and "Call ID" header data. Processing then moves to step 1007 where the dialogue data 203 is inspected to determine whether the dialogue is part of an existing dialogue or the initiation of a new dialogue. If the received message forms part of a new dialogue then a new entry is made in the dialogue data 203. If the received message forms part of an existing dialogue then the corresponding TCAP dialogue identifier is identified. Processing then moves to step 1008 where the message definition 205 corresponding to the received SIP message type is extracted and applied to the received message. Accordingly the appropriate elements are extracted from the SIP message and placed in the component part of a TCAP message. The identified TCAP transaction ID (OTID) identified in the dialogue data 203 is also included in the TCAP message. Processing then moves to step 1009 where the assembled TCAP message carrying the received SIP message is transmitted over the IN network. Processing then returns to step 604 and proceeds as described above.

If at step 1005 the received message is identified as a TCAP message then processing moves to step 1010. At step 1010, the message is parsed so as to identify the TCAP operation code and to extract the TCAP dialogue identifier. Processing then moves to step 1011 where the dialogue data 203 is inspected to determine whether the dialogue is part of an existing dialogue or the initiation of a new dialogue. If the received message forms part of a new dialogue then a new entry is made in the dialogue data 203. If the received message forms part of an existing dialogue then the corresponding SIP dialogue data is identified. Processing then moves to step 1012 where the message definition 205 corresponding to the operation code in the received TCAP message is extracted and applied to the received message. Accordingly the appropriate elements are extracted from the TCAP component portion to form a SIP message. Processing then moves to step 1013 where the assembled SIP message extracted form the received TCAP message is transmitted over the IP network. Processing then returns to step 604 and proceeds as described above.

Thus, the registrar server application, developed using IN SCE and running on an IN server is able to provide its functionality to a client in an IP network, by using the functionality that can be created using the IN SCE. An application program is built within the IN SCE that is arranged to perform its processing in response to the extracted elements of an IP protocol message encapsulated in an IN protocol message and to communicate the results of its processing to the IP client via IP protocol message encapsulated in IN protocol messages.

In another embodiment, the IN server does not have same set of message definitions as the gateway but instead provides the equivalent function by any other suitable means.

In further embodiment, other suitable IP or IN protocols are used other than the TCAP or SIP protocols.

In another embodiment, the IN application program does not perform IP/IN message conversion. Instead, the conversion is performed by a separate interface arranged to extract IP message elements from IN messages and present them as data to the application program and to encapsulate IP message elements within IN messages for transmission to the IP client.

In the above description the term PSTN is used to refer to one or more PSTNs used in combination with, or as part of, a Public Land Mobile Network (PLMN) or to one or more PLMNs used in combination.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for providing communications between a first processing element in a packet switched network and a second processing element in a public switched telephone network (PSTN), said second processing element being arranged to process messages from said first processing element, said method comprising the steps of:
   a) receiving a first message in accordance with a packet switched network protocol from a first processing element in a packet switched network, said first message identifying a second processing element in a PSTN network for processing said first message;
   b) extracting at least one element from said first message, said at least one element being associated with the packet switched network protocol and not being associated with a PSTN protocol;
   c) selecting a message type from the PSTN protocol;
   d) building a second message, in accordance with said selected message type and encapsulating said at least one extracted element in said second message; and
   e) sending said second message to said second processing element.

2. The method according to claim 1 in which said message type for said second message is selected in dependence on said message type of said first message in said PSTN protocol.

3. The method according to claim 1 in which said at least one element extracted from said first message and encapsulated in said second message comprise an instruction element and one or more data elements.

4. The method according to claim 1 in which said first message forms a part of a first dialogue performed over said packet switched network and said second message forms part of a second dialogue performed over said PSTN and the method comprises the further step of recording a mapping between said first and second dialogue.

5. The method according to claim 1 in which a set of predetermined message rules are used to select said message type for said second message.

6. The method according to any preceding claim comprising the further steps of:
- receiving a third message from said second processing element in response to said second message;
- extracting one or more elements from said third message for building a fourth message, in accordance with said packet switched network protocol; and
- sending said fourth message to said first processing element.

7. The method according to claim 6 in which messages in accordance with said PSTN protocol comprises a transaction part and data part, said first message being encapsulated in said data part in accordance with a predetermined configuration and said third message being encapsulated in said data part of said fourth message so as to enable the direct extraction of said fourth message from said third message.

8. The method according to claim 1 in which said packet switched network is an Internet Protocol (IP) network and said PSTN is an Intelligent Network (IN) network.

9. The method according to claim 1 in which said packet switched network protocol is Session Initiation Protocol (SIP) and said PSTN protocol is Transaction Capabilities Application Part (TCAP).

10. An apparatus for providing communications between a first processing element in a packet switched network and a second processing element in a public switched telephone network (PSTN), said second processing element being arranged to process messages from said first processing element, said apparatus being operable to:
- receive a first message in accordance with a packet switched network protocol from a first processing element in a packet switched network, said first message identifying a second processing element in a PSTN network for processing said first message;
- extract at least one element from said first message, said at least one element being associated with the packet switched network protocol and not being associated with a PSTN protocol;
- select a message type from the PSTN protocol;
- build a second message, in accordance with said selected message type and encapsulating said at least one extracted element in said second message; and
- send said second message to said second processing element.

11. The apparatus according to claim 10 in which said message type for said second message is selected in dependence on said message type of said first message in said PSTN protocol.

12. The apparatus according to claim 10 in which said at least one element extracted from said first message and encapsulated in said second message comprise an instruction element and one or more data elements.

13. The apparatus according to claim 10 in which said first message forms a part of a first dialogue performed over said packet switched network and said second message forms part of a second dialogue performed over said PSTN and the said apparatus is further operable to record a mapping between said first and second dialogue.

14. The apparatus according to claim 10 in which a set of predetermined message rules are used to select said message type for said second message.

15. The apparatus according to claim 10 being further operable to:
- receive a third message from said second processing element in response to said second message;
- extract one or more elements from said third message for building a fourth message, in accordance with said packet switched network protocol; and
- send said fourth message to said first processing element.

16. The apparatus according to claim 15 in which messages in accordance with said PSTN protocol comprises a transaction part and data part, said first message being encapsulated in said data part in accordance with a predetermined configuration and said third message being encapsulated in said data part of said fourth message so as to enable the direct extraction of said fourth message from said third message.

17. The apparatus according to claim 10 in which said packet switched network is an Internet Protocol (IP) network and said PSTN is an Intelligent Network (IN) network.

18. The apparatus according to claim 10 in which said packet switched network protocol is Session Initiation Protocol (SIP) and said PSTN protocol is Transaction Capabilities Application Part (TCAP).

19. An article comprising at least one non-transitory machine-readable storage medium storing instructions that upon execution cause a system having at least one processor to:
- receive a first message in accordance with a packet switched network protocol from a first processing element in a packet switched network, said first message identifying a second processing element in a PSTN network for processing said first message;
- extract at least one element from said first message, said at least one element being associated with the packet switched network protocol and not being associated with a PSTN protocol;
- select a message type from the PSTN protocol;
- build a second message, in accordance with said selected message type and encapsulate said at least one extracted element in said second message; and
- send said second message to said second processing element.

20. An apparatus comprising:
a message parser adapted to:
- receive a first message in accordance with a packet switched network protocol from a processing element in a packet switched network, said first message identifying a second processing element in a PSTN network for processing said first message; and
- extract at least one element from said first message, wherein said at least one element is associated with the packet switched network protocol and is not associated with a PSTN protocol;

a processor-based message builder adapted to:
- extract at least one element from said first message, said at least one element being associated with the packet switched network protocol and not being associated with a PSTN protocol;
- select a message type from the PSTN protocol;
- build a second message, in accordance with said selected message type and encapsulate said at least one extracted element in said second message; and a message transmitter adapted to send said second message to said second processing element.

* * * * *